United States Patent
Hu et al.

(10) Patent No.: US 12,537,861 B2
(45) Date of Patent: Jan. 27, 2026

(54) LLM POWERED SECURITY PRODUCT FACADE

(71) Applicant: Palo Alto Networks, Inc., Santa Clara, CA (US)

(72) Inventors: Mengying Hu, Santa Clara, CA (US); Zhibin Zhang, Santa Clara, CA (US); Yu Fu, Sunnyvale, CA (US); Mei Wang, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 35 days.

(21) Appl. No.: 18/761,517

(22) Filed: Jul. 2, 2024

(65) Prior Publication Data
US 2026/0012490 A1 Jan. 8, 2026

(51) Int. Cl.
*H04L 9/40* (2022.01)

(52) U.S. Cl.
CPC ........ *H04L 63/205* (2013.01); *H04L 63/1425* (2013.01)

(58) Field of Classification Search
CPC .......................... H04L 63/205; H04L 63/1425
See application file for complete search history.

(56) References Cited

U.S. PATENT DOCUMENTS

| | | | | |
|---|---|---|---|---|
| 12,346,657 B2 * | 7/2025 | Yu | .......................... | G06F 21/577 |
| 2024/0265106 A1 * | 8/2024 | Mehta | ...................... | G06F 21/57 |
| 2025/0088517 A1 * | 3/2025 | Davraev | ................ | G06N 3/045 |
| 2025/0247432 A1 * | 7/2025 | Lane | ........................ | H04L 63/20 |
| 2025/0259188 A1 * | 8/2025 | Dauber | .............. | G06Q 30/0201 |

* cited by examiner

*Primary Examiner* — Aubrey H Wyszynski
(74) *Attorney, Agent, or Firm* — Gilliam IP PLLC (57) ABSTRACT

An AI-based application uses AI models to expeditiously identify a product or service most relevant to an issue input to the application instead of a user navigating a platform or catalogue of products/services. The application prompts a first language model to convert the input description into a structured description of the issue. The application then, for each product/service category, prompts a second language model to identify a product/service most relevant to the structured description within each product/service category. The application then returns an identification of a product/service determined to be most relevant to the issue as represented by the structured description, confidence in the identification, and a reason the product/service was identified.

20 Claims, 5 Drawing Sheets

LLM POWERED SECURITY PRODUCT FACADE

BACKGROUND

The disclosure generally relates to data processing (e.g., CPC subclass G06F) and to computing arrangements based on specific computational models (e.g., CPC subclass G06N).

Rapid developments in artificial intelligence (AI) technologies have spawned numerous terms with fluid meanings. Recently, AI technologies are frequently referred to with the terms large language model (LLM), generative AI, and foundation model. Many of these technologies are based on or relate to the "Transformer" architecture.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks. There has been subsequent research in similar Transformer-based sequence modeling. The architecture of a Transformer model typically is a neural network with transformer blocks/layers, which include self-attention layers, feed-forward layers, and normalization layers. The Transformer model learns context and meaning by tracking relationships in sequential data.

Some LLMs are based on the Transformer architecture. An LLM is "large" because the training parameters are typically in the billions and have been approaching a trillion parameters. AI technologies are not limited to LLMs and research and utilization of "lightweight" language models (i.e., fewer parameters than large) has grown. Language models can be pre-trained to perform general-purpose tasks or tailored to perform specific tasks. Tailoring of language models can be achieved through various techniques, such as prompt engineering and fine-tuning.

The first instances of generative models can be found in research of the 1960s and 1970s which used generative models and statistical models to generate new instances of data. Advancements in neural networks and deep learning increased the capabilities of generative AI. The introduction of generative adversarial networks (GAN), considered a foundation model, created media that was arguably original. The introduction and advancements of the Transformer architecture yielded the Generative Pre-Trained Transformer (GPT) often associated with current generative AI technology.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

A "technology stack" refers to a collection of technologies (e.g., libraries, tools, framework, etc.) that integrate and/or coordinate across layers to develop and/or deploy software, websites, or services. This term has commonality with the network stack with the intent to convey a visualization for understanding interaction of the collection of technologies. Generally, a technology stack or "tech" stack includes a presentation layer (e.g., front end), application layer (e.g., core logic or backend), and data layer (i.e., storage and management of data). An AI stack or language model (LM) stack will at least include a model layer as well, likely instead of a backend. An AI/LM stack may also include an orchestration layer. The orchestration layer coordinates operations and/or integrates data across components including a foundation model. In some cases, the components include multiple foundation models. Thus, the orchestration layer coordinates operations and/or requests and responses of the models. The orchestration layer can include or invoke components that construct prompts and extract information from responses to use in prompt construction and/or to combine with information from other responses.

A "prompt" refers to input to a foundation model and "prompting" refers to the act of submitting a prompt to a model to perform inference based on the submitted prompt. A prompt at least includes a natural language task instruction to the model. A prompt can also include context, constraints, and examples. In other words, a prompt is a natural language task instruction and other information that can assist the model in performing the task successfully. A prompt can have more than one task instruction and prompts can be chained to incorporate responses from the model into a subsequent prompt. A prompt can be entered by a user and/or constructed from a prompt template.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Organizations and individuals face an onslaught of changing and never-ending attacks. To combat this onslaught, cybersecurity provider responses result in a rapidly expanding set of products and services offered to protect against and/or respond to the attacks. It can be overwhelming and frustrating to users to navigate a platform or suite of offerings to determine which offering to use or acquire. In addition to the challenge of determining which product/service is most relevant to an attack, time spent navigating available offerings to identify the most relevant offering introduces delay in protecting or responding to an attack.

An AI powered product façade has been created that expeditiously identifies a product most relevant to a described issue. The AI powered product façade is an application or AI stack that presents a simple façade in front of numerous products/services across multiple categories. Behind this façade, the application uses AI models to expeditiously identify a product or service most relevant to an issue input to the application instead of a user navigating a platform or catalogue of products/services. The application prompts a first language model to convert an input description of an issue into a structured description of the issue. The application then, for each product/service category, prompts a second language model to identify a product/service most relevant to the structured description within each product/service category. The application then selects a response with the most relevant product/service based on confidence and returns at least an identification of the most relevant product/service. Implementations can include at least one of confidence in the identification and a reason the product/service was identified.

Example Illustrations

Figure 1:
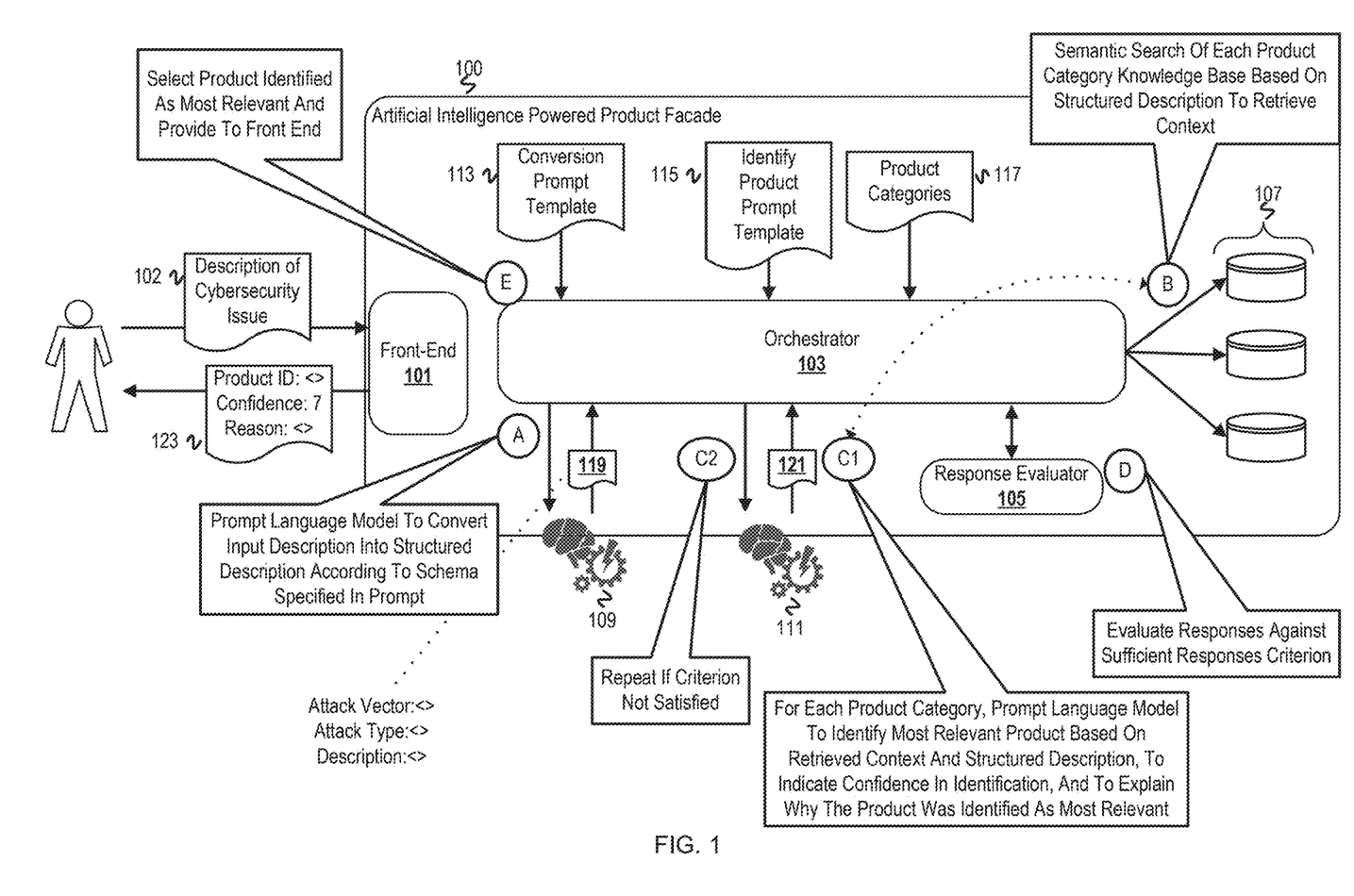
FIG. 1 is a diagram of an AI powered application that automatically identifies which of multiple products/services is most relevant with respect to a cybersecurity issue.

FIG. 1 is a diagram of an AI powered application that automatically identifies which of multiple products/services is most relevant with respect to a cybersecurity issue. The AI powered application is depicted as an AI powered product façade 100. The AI powered product façade 100 includes a front-end 101, an orchestrator 103, knowledge bases 107, and a response evaluator 105. The front-end 101 is a user interface for the AI powered product façade 100 (hereinafter "application") that accepts requests or user prompts. The orchestrator 103 has access to prompt templates and constructs prompts and well as orchestrates the different functionality of the application 100. The knowledge bases 107 are knowledge bases or embeddings databases for categories of products used or available to an organization. The response evaluator 105 evaluates responses to determine whether they are sufficient to convey an identified product/service to users via the front-end 101. The application 100 uses language models 109, 111. FIG. 1 does not depict the language models 109, 111 as part of the application 100, but model deployment can vary across implementations. The use of different models prevents the requests and/or responses of one model being context that influences output of another model. For instance, a post from a security blog may be input to one model for determining a cybersecurity issue(s) in the post, but the other information in the post would be noisy context or irrelevant context for the task of the other model.

FIG. 1 is annotated with a series of letters A, B, C1, C2, D, and E. Each of these letters identify a stage and each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the orchestrator 103 prompts the language model 109 to convert an input description 102 into a structured description according to a schema specified in the prompt submitted to the language model 109. A user inputs a description 102 of a cybersecurity issue to the application 100 via the front-end 101. Upon receipt of the input description 102, the orchestrator 103 constructs a prompt using a conversion prompt template 113 and the input description 102. The conversion prompt template 113 includes a task instruction for a language model to generate a structured version of the input description 102. The conversion prompt template 113 also includes a schema definition for the model to apply for generating the structured version of the input description 102. The orchestrator 103 submits the constructed prompt to the language model 109 and receives a response 119 with the structured description. For example, the structured description can include 3 fields: attack vector, attack type, and description (i.e., narrative description). To avoid a lengthy narrative description being returned from the language model 109, the conversion prompt template 113 can include a constraint that the description element must be succinct and no more than 50 words.

At stage B, the orchestrator 103 performs a semantic search of each product category corresponding to the knowledge bases 107 based on the structured description to retrieve context. The knowledge bases 107 can be embeddings databases built by feeding product documentation into an embedding model to build the embeddings databases. Each of the knowledge bases 107 is built with documentation of products of a product category. A list 117 of product categories is maintained for the application 100 (e.g., a configuration file is maintained with the product categories). Personnel of an organization can edit the list depending on a desired taxonomy and products/services of interest or used by the organization. The orchestrator 103 selects each product category in the list 117 and then searches the corresponding one of the knowledge bases 107. The product category can reference or be associated with a knowledge base identifier in the list 117. The result of the search in the product category knowledge base, whether be text or an embedding, is incorporated into the prompt that will be constructed for prompting the second language model. The iteration between the search and prompting in stage C1 is represented by a dotted line in FIG. 1 connecting the stage B and C1 annotations.

At stage C1, the orchestrator 103, for each product category, prompts the language model 111 to identify a most relevant product in the product category based on the retrieved context (i.e., search result of stage B) and the structured description (obtained in stage A). In addition to identifying a most relevant product, the orchestrator 103 prompts the language model 111 to indicate confidence in the product identification, and to explain why the product was identified as most relevant. The orchestrator 103 constructs each prompt with an identify product prompt template 115. The identify product prompt template 115 includes task instruction for a model to identify a most relevant product with respect to a structured description to be inserted or incorporated into the prompt and based on retrieved context. The identify product prompt template 115 also includes task instructions for a model to indicate confidence in the identification of the product as relevant on a defined scale (e.g., 0-10) and to provide a reason for the product being identified as relevant to the cybersecurity issues as represented by the structured description. The identify product prompt template 115 can also specify a format for the answer/response. The orchestrator 103 submits the constructed prompt to the language model 111 and obtains a response 121.

At stage D, the response evaluator 105 evaluates responses against a sufficient responses criterion. After the orchestrator 103 obtains the responses to the prompts from the language model 111, the orchestrator 103 passes the responses or at least the content of the responses to the response evaluator 105. The response evaluator 105 uses a sufficient responses criterion or sufficiency criterion to evaluate the responses. It can be the case that a language model returns an empty response or a response with less than the specified answer elements (e.g., identifies a product but does not provide a reason). The sufficient responses criterion specifies that at least m of the of the n responses must indicate all response elements and a minimum confidence (e.g., confidence value greater than 5 on a 0-10 scale).

At stage C2, if the sufficient responses criterion was not satisfied, the orchestrator 103 repeats the prompting for each product category represented by stage C1. If the response evaluator 105 determines that the responses did not satisfy the sufficient responses criterion, then the response evaluator 105 notifies the orchestrator 103 which causes the orchestrator 103 to repeat the prompting for identification of a relevant product/service. Prompting at stage C1 and evaluation of responses at stage D can be repeated until the response evaluator 105 determines that the sufficient responses criterion is satisfied.

At stage E, the orchestrator 103 selects a product identified as most relevant in the responses based on confidence values and provides identification of the product to the front-end 101. Implementation can provide the product identifier alone, although users/customers likely prefer additional information to understand the identification. Thus, the orchestrator 103 likely provides to the front-end for presentation at least the product identifier and explanation/reason if not also the confidence value.

Figure 2:
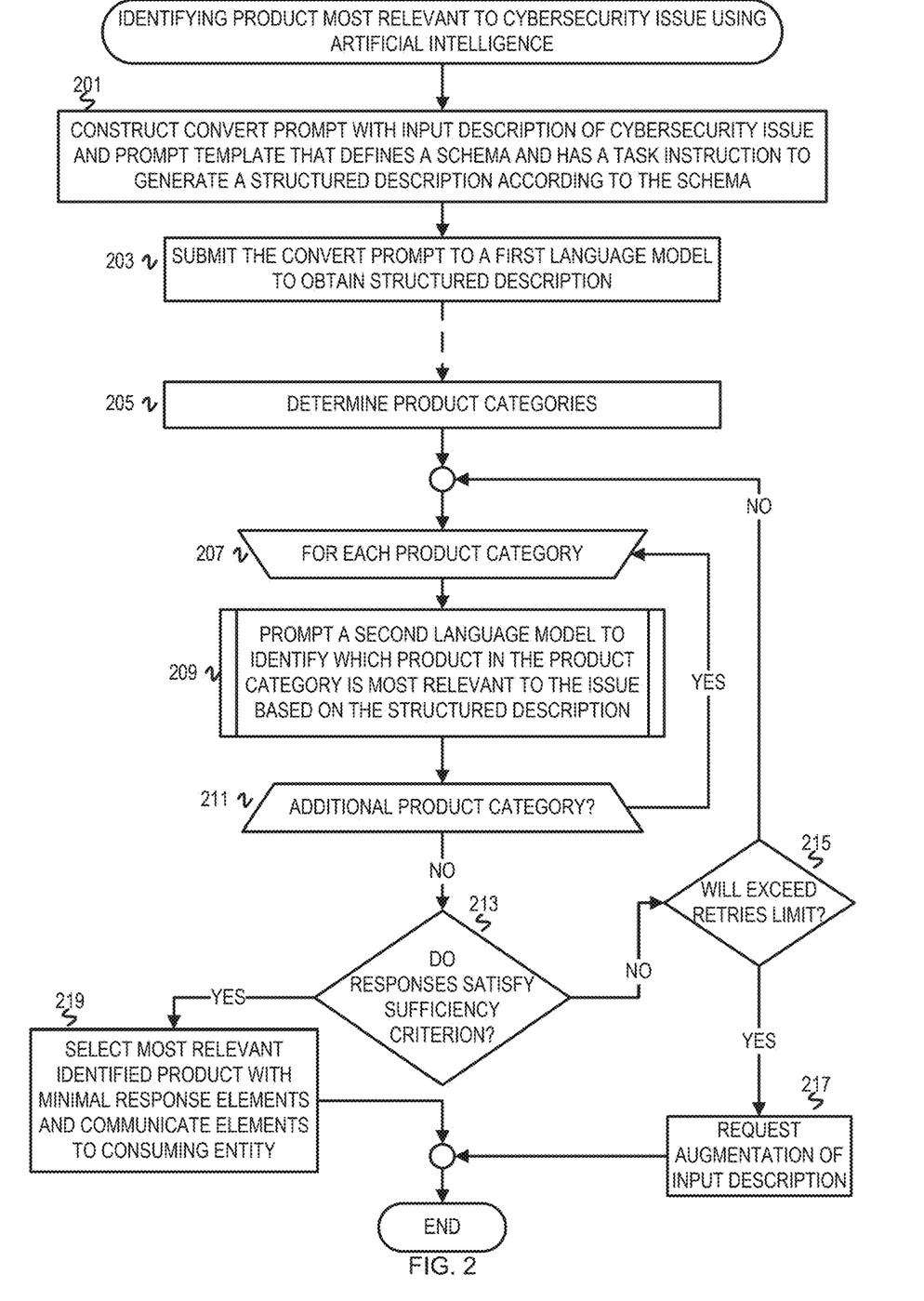
FIG. 2 is a flowchart of example operations for identifying a product/service most relevant to a cybersecurity issue using artificial intelligence.
Figure 3:
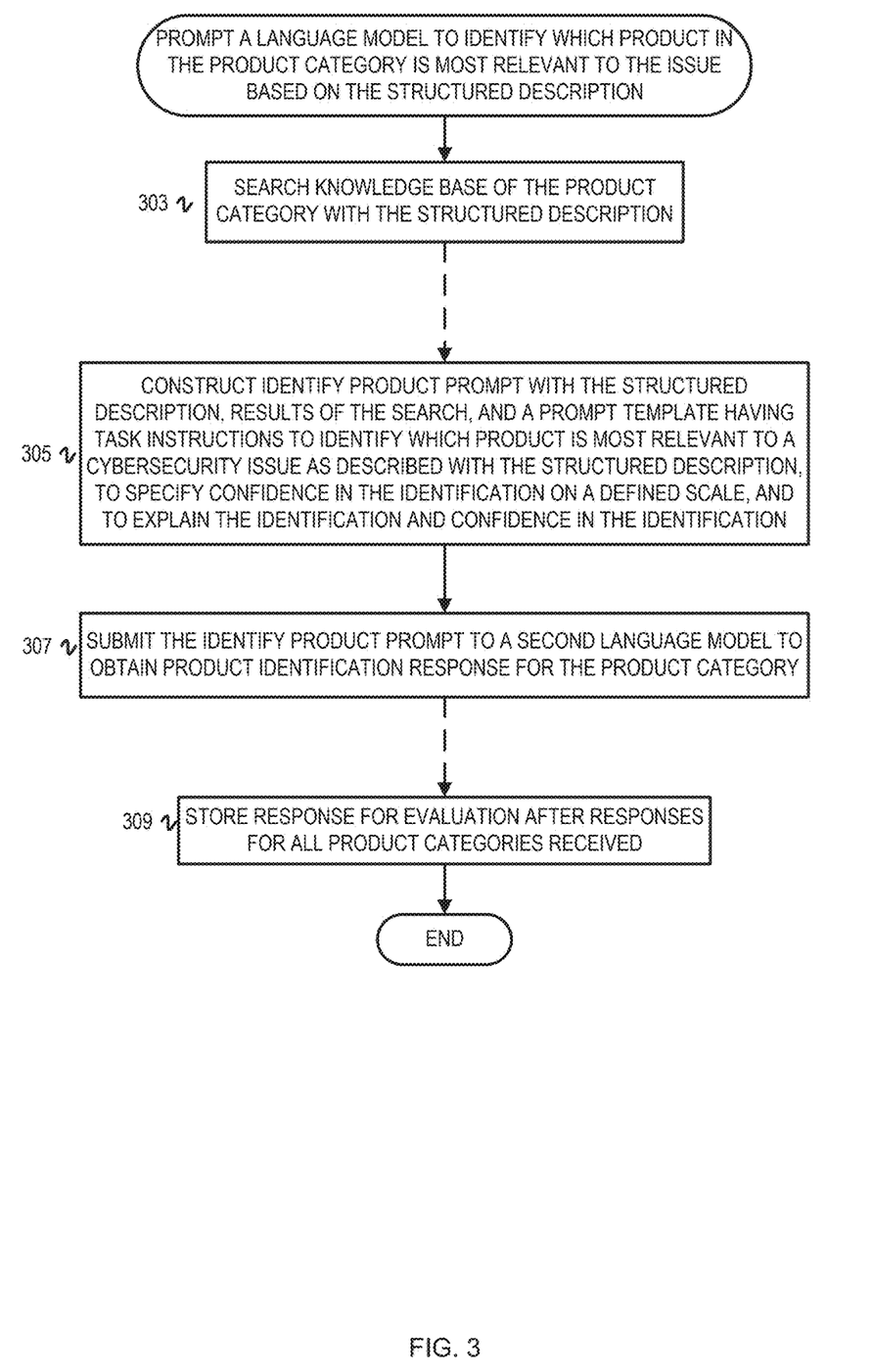
FIG. 3 is a flowchart of example operations for prompting a language model to identify which product in a product category is most relevant to a described issue based on a structured description and context retrieval.
Figure 4:
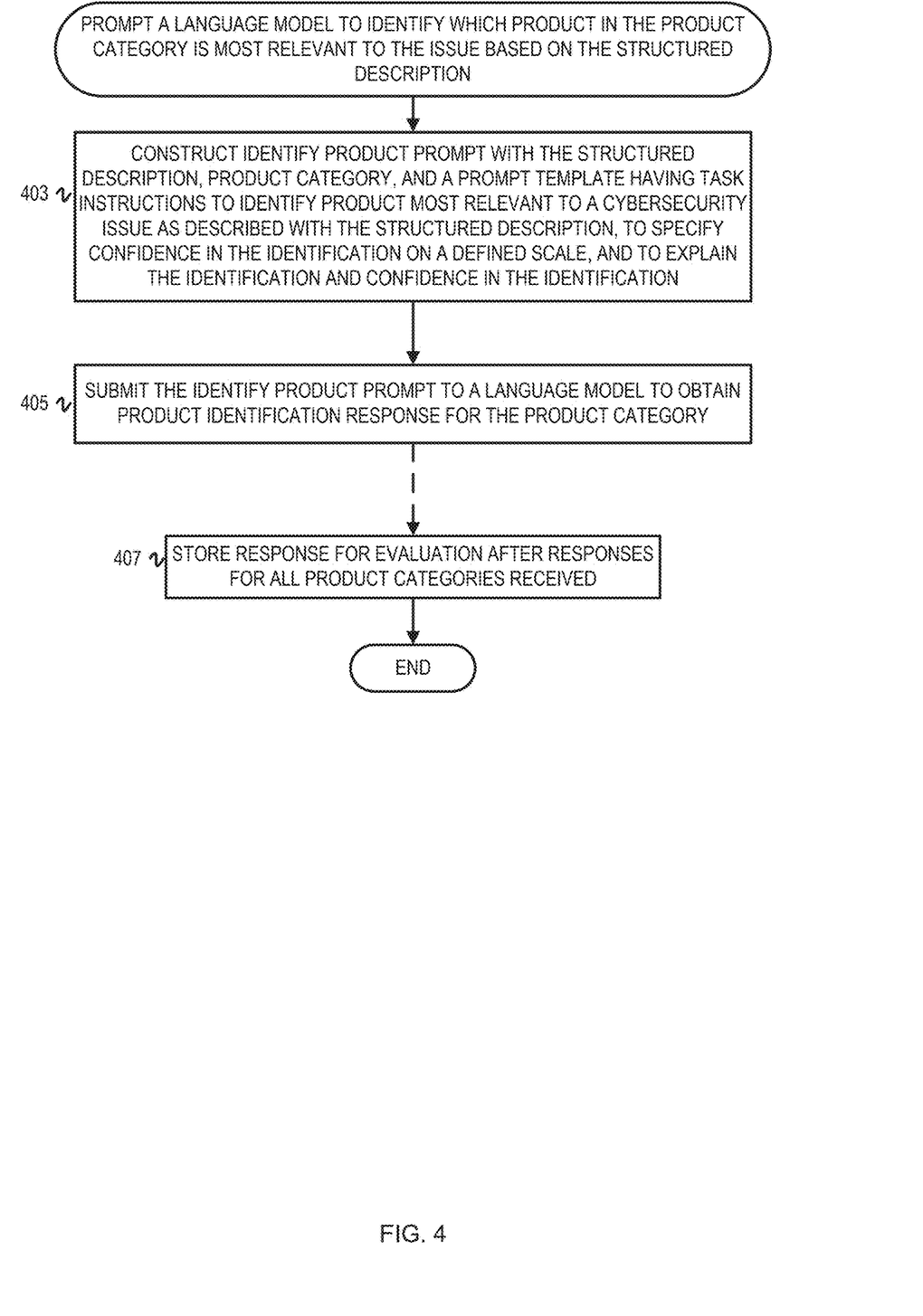
FIG. 4 is a flowchart of example operations for prompting a language model to identify which product in a product category is most relevant to a described issue based on a structured description and parameterized knowledge of the language model.

FIGS. 2-4 are flowcharts that expand beyond the example of FIG. 1. For instance, FIG. 1 depicts knowledge bases 107 to be maintained for product categories and used for context retrieval based on semantic searching. Embodiments are not limited to this technique. Embodiments can feed product documentation per category to a language model so the product documentation becomes parameterized knowledge. The example operations of the flowcharts are described with reference to an application as shorthand for the AI powered application for consistency with FIG. 1 and/or ease of understanding. The name chosen for the program code is not to be limiting on the claims. For example, the application may instead be referred to as a pipeline. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for identifying a product/service most relevant to a cybersecurity issue using artificial intelligence. The example operations eschew front-end operations since presentation of the information can vary greatly by implementation. The example operations also presume use of external or remotely hosted language models accessible via application programming interfaces (API) of the language models. Thus, dashed lines are used to represent the "waiting" for a response from a language model.

At block 201, the application constructs a convert prompt with an input description of a cybersecurity issue and prompt template. The prompt template defines a schema and has a task instruction to generate a structured description according to the schema. The input description can be received via a user interface from a user or via an interface from another process. For instance, the application can be configured to automatically receive published descriptions of cybersecurity issues (e.g., subscribed to producer or publisher of CVE® alerts). The input description may be unstructured or structured. Thus, the prompt may cause a model to convert an unstructured description into a structured description according to the specified schema/format or cause the model to convert a structured input description into a structured description according to the prompt specified schema/format.

At block 203, the application submits the convert prompt to a first language model to obtain structured description. For instance, the application makes an API call that includes the convert prompt as a payload. Operational flow proceeds from block 203 to 205 as depicted by a dashed line.

At block 205, the application determines product categories. The products available to an organization or offered by an organization typically fall into different categories. Examples of categories include network security, cloud-native application protection, and AI-driven security operations. The product categories may be defined by the organization offering the products. Alternatively, an organization can define its own categories for products/services used by the organization.

At block 207, the application begins iteratively selecting each product category.

At block 209, the application prompts a second language model to identify which product in the product category is most relevant to the described issue based on the structured description. The application constructs a prompt with the structured description and indication of the product category. The application also constructs the prompt with task instructions from a template for the model to identify the most relevant product in the product category, to specify a confidence on a defined scale, and to provide a reason for identifying the product as most relevant. FIGS. 3 and 4 provide example operations corresponding to block 209 with variation dependent upon how product documentation becomes knowledge for the model.

At block 211, the application determines whether there is an additional product category to select. If not, then operational flow proceeds to block 213. If there is an additional product category to select, then operational flow returns to block 207.

At block 213, the application determines whether the responses from the second language model satisfy a sufficiency criterion. A sufficiency criterion will specify a condition that at least one of the responses must satisfy. As mentioned earlier, a response must identify a product and either a confidence or explanation/reason for the product being identified as most relevant. Implementations can set a condition that all three elements must be present in at least one of the responses. Implementations can also require that confidence be at least a minimum value and/or the reason have a minimum length. If the responses do not satisfy the sufficiency criterion, then operational flow proceeds to block 215. If the responses satisfy the sufficiency criterion, then operational flow proceeds to block 219.

At block 215, the application determines whether a retry would exceed a retries limit. Since responses are non-deterministic, the application can resubmit the prompts to obtain sufficient response. However, the cost, in terms of resources and user experience, would be a limiting factor for retries. The retry limit would be a configurable value, and implementations can vary the manner of retry. For example, the application can modify the prompts by requesting the first language model or the second language model to rewrite the narrative description in the structured description incorporated into the prompts. If the retry will not exceed the retry limit, then operational flow returns to block 207 and the application iterates over the product categories again. If the retry will exceed the retry limit, then operational flow proceeds to block 217.

At block 217, the application requests augmentation of the input description. The application can invoke a front-end to respond to a user with a request to add information to the input description.

At block 219, the application selects the most relevant identified product with minimal response elements and communicates the elements to a consuming entity. The application determines which responses satisfy the sufficiency criterion. Implementations can present multiple product identification responses that have the same highest confidence value or allow for small margins of variance. From those responses, the application selects the response with the highest confidence. A consuming entity may be a front-end, a file, or another process.

Below are examples of input descriptions and corresponding responses. The first and second examples are for a supply chain attack. Each example includes a different response identifying a different product.

| First Example Description of a Cybersecurity Issue | First Response that Identifies a Product |
|---|---|
| issue: "3CXDesktopApp Supply Chain Attack" description: "The 3CXDesktopApp supply chain attack began with threat actors introducing malicious libraries into the legitimate 3CXDesktopApp installation application, likely by including these libraries during the build process of 3CXDesktopApp. With the malicious libraries included in the legitimate installer, individuals fall victim by downloading and running the 3CXDesktopApp installer from the developer's website." | product_name: "Advanced Threat Prevention" confidence_score: 6 reason: "Advanced Threat Prevention can detect the 3CXDesktopApp supply chain attack by identifying command-and-control (C2) traffic. It monitors network connections for suspicious activities associated with malicious C2 servers, a common characteristic of supply chain attacks, allowing it to detect, block, and mitigate such threats effectively." |

| Second Example Description of a Cybersecurity Issue | Second Response that Identifies a Product |
|---|---|
| issue: "3CXDesktopApp Supply Chain Attack" description: "The 3CXDesktopApp supply chain attack began with threat actors introducing malicious libraries into the legitimate 3CXDesktopApp installation application, likely by including these libraries during the build process of 3CXDesktopApp. With the malicious libraries included in the legitimate installer, individuals fall victim by downloading and running the 3CXDesktopApp installer from the developer's website." | product_name: "Advanced WildFire" confidence_score: 5 reason: "Advanced WildFire can detect the 3CXDesktopApp supply chain attack because it identifies malicious libraries. By using advanced static and dynamic analysis, WildFire inspects files and detects embedded malicious code and behaviors, enabling it to recognize and block compromised components in applications like 3CXDesktopApp." |

The third example is for an input description that is a CVE alert.

| Third Example Description of a Cybersecurity Issue | Third Response that Identifies a Product |
|---|---|
| issue: "CVE-2023-34362" description: "In Progress MOVEit Transfer before 2021.0.6 (13.0.6), 2021.1.4 (13.1.4), 2022.0.4 (14.0.4), 2022.1.5 (14.1.5), and 2023.0.1 (15.0.1), a SQL injection vulnerability has been found in the MOVEit Transfer web application that could allow an unauthenticated attacker to gain access to MOVEit Transfer's database." | product_name: "Advanced Threat Prevention" confidence_score: 5 reason: "Advanced Threat Prevention can detect and prevent SQL injection vulnerabilities, which is the type of vulnerability exploited in CVE-2023-34362. It uses deep learning models for inline analysis to prevent zero-day threats and SQL injection vulnerabilities." |

FIG. 3 is a flowchart of example operations for prompting a language model to identify which product in a product category is most relevant to a described issue based on a structured description and context retrieval. The example operations of FIG. 3 presume that the product documentation has been ingested into knowledge bases, such as embeddings databases to facilitate semantic searching. The example operations of FIG. 3 will repeat for each product category.

At block 303, the application searches a knowledge base of the product category with the structured description. In the case of an embeddings database, the application would obtain an embedding of the structured description with the embedding model that was used to build the embeddings database. Operational flow proceeds from block 303 to 305 as depicted by a dashed line representing waiting for the search results.

At block 305, the application constructs an identify product prompt with the structured description, results of the search, and a prompt template. The prompt template includes task instructions to identify which product in the product category represented by the search results is most relevant to a cybersecurity issue as described with the structured description, to specify confidence in the identification on a defined scale, and to explain the identification and confidence in the identification. The prompt template can also include a constraint to write the explanation succinctly and specify a word limit.

At block 307, the application submits the identify product prompt to a language model to obtain a product identification response for the product category. The language model is different than the language model that generated the structured description. The application submits an API call, for example, with the identify product prompt as a payload. Operational flow proceeds from block 307 to 309 as depicted by a dashed line representing waiting for the response.

At block 309, the application stores the response for evaluation after responses for all product categories have been received. The application can cache each response until all responses have been received so that the responses can be evaluated against the sufficiency criterion. However, implementations can store sets of responses up to a threshold and then evaluate each set instead of waiting for responses for all product categories.

FIG. 4 is a flowchart of example operations for prompting a language model to identify which product in a product category is most relevant to a described issue based on a structured description and parameterized knowledge of the language model. The example operations of FIG. 4 presume that the product documentation has been ingested into a model as parameterized knowledge. The example operations of FIG. 4 will repeat for each product category. The example operations of FIG. 4 are similar to those in FIG. 3. The description is reduced to avoid repetition.

At block 403, the application constructs an identify product prompt with the structured description, a product category, and a prompt template. The prompt template includes task instructions as previously described. Instead of incorporating retrieved context as described in FIG. 3, the indication of the product category provides context.

At block 405, the application submits the identify product prompt to a language model to obtain a product identification response for the product category. Operational flow proceeds from block 405 to 407 as depicted by a dashed line representing waiting for the response.

At block 407, the application stores the response for evaluation after responses for all product categories have been received.

Variations

The described examples use a prompt per category. Embodiments, however, could consolidate the prompts per category into a single prompt. For instance, an implementation can construct a prompt by repeatedly adding the task instructions and constraints from the template into a prompt with additional instructions to disregard a previous response when generating a subsequent response.

The examples also describe zero shot prompting. Embodiments can use other prompt engineering or fine-tuning. A language model can be fine-tuned with input descriptions including CVE alerts, blog posts, and new articles. An organization that offers relevant products/services identifies the most relevant product/service for fine-tuning. Moreover, embodiments are not limited to cybersecurity issues. The disclosed technology can be used for other types of products/services that have a taxonomy as long as the issues have a corresponding issue description.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
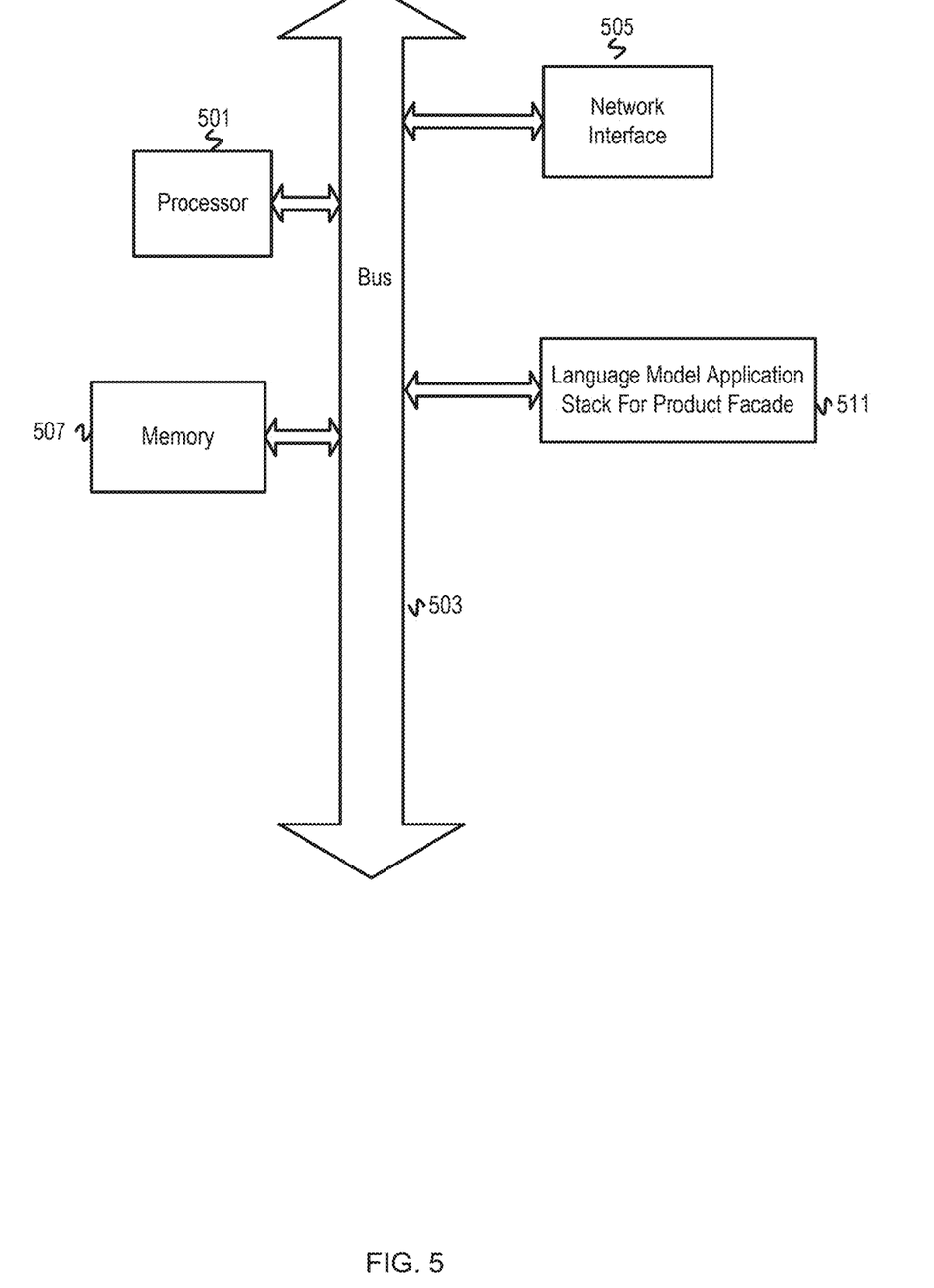
FIG. 5 depicts an example computer system with a language model application stack for a product facade.

FIG. 5 depicts an example computer system with a language model application stack for a product facade. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a language model application stack or LM stack 511. The LM stack 511 uses a first prompt template and prompts a model to convert an input description into a structured description according to a schema or format defined in the first prompt template. The LM stack 511 then uses a second prompt template and prompts another language model to identify which product in a product category is most relevant to the issue described in the structured description. To be an effective product identification, the second prompt template includes instructions for the language model to provide a reason for the product being most relevant and confidence in the identification. This is repeated for each product category. The LM stack 511 evaluates the responses from the language model and determines a most relevant product from the responses. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
   prompting a first language model to generate a structured description of a cybersecurity issue from an input description of the cybersecurity issue;
   prompting a second language model to identify a most relevant product for the cybersecurity issue based on the structured description output by the first language model, wherein prompting the second language model comprises, for each of a plurality of categories of products,
   constructing and submitting to the second language model a prompt with task instructions to identify a relevant product in the category with respect to the structured description, to indicate confidence that the identified product is relevant, and to provide a reason the identified product is relevant;
   evaluating responses from the second language model with respect to a sufficiency criterion;
   based on a determination that the responses satisfy the sufficiency criterion, indicating the identified product having highest confidence as the most relevant product; and
   based on a determination that the responses do not satisfy the sufficiency criterion, again prompting the second language model to identify a most relevant product for the cybersecurity issue based on the structured description.

2. The method of claim 1, wherein the input description of the cybersecurity issue comprises an unstructured description.

3. The method of claim 1, wherein prompting the first language model comprises creating and submitting a prompt with a task instruction to generate the structured description according to a schema that includes fields or keys for attack vector, attack type, and description.

4. The method of claim 3, wherein the task instruction comprises a constraint of a maximum text or token length for the description.

5. The method of claim 1, wherein evaluating the responses with respect to the sufficiency criterion comprises determining whether at least one of the responses indicates a confidence of at least a specified minimum confidence.

6. The method of claim 5, wherein evaluating the responses with respect to the sufficiency criterion further comprises determining whether at least one of the responses indicates a reason for the identified product as well as confidence of at least a specified minimum confidence.

7. The method of claim 1, further comprising maintaining an embeddings database for each of the plurality of categories of products with documentation of products in the corresponding category, wherein an artificial intelligence application comprises the second language model and a front-end that searches the embeddings databases and incorporates results into the prompt submitted to the second language model.

8. The method of claim 1, further comprising separately inputting into the second language model for each category of products documentation of products in the category.

9. A non-transitory, machine-readable medium having program code stored thereon, the program code comprising:
   first instructions for a front-end to receive an input description of a cybersecurity issue and to prompt a first language model to generate a structured description of the cybersecurity issue;
   second instructions to prompt a second language model to identify a product of an organization's products that is most relevant to the cybersecurity issue, wherein the second instructions to prompt the second language model comprise instructions to,
   for each of a plurality of categories of the organization's products,
   construct a prompt with task instructions to identify a relevant product in the category based on the structured description, to indicate confidence that the identified product is relevant, and to provide a reason the identified product is relevant; and submit the prompt to the second language model; and third instructions to determine whether responses from the second language model satisfy a sufficiency criterion and to either indicate the identified product having highest confidence as the most relevant to the cybersecurity issue if the responses satisfy the sufficiency criterion or again prompt the second language model to identify a most relevant product for the cybersecurity issue based on the structured description if the responses do not satisfy the sufficiency criterion.

10. The non-transitory, machine-readable medium of claim 9, wherein the input description of the cybersecurity issue comprises an unstructured description.

11. The non-transitory, machine-readable medium of claim 9, wherein the first instructions to prompt the first language model comprise instructions to create and submit to the first language model a prompt with a task instruction to generate the structured description according to a schema that includes fields or keys for attack vector, attack type, and description.

12. The non-transitory, machine-readable medium of claim 9, wherein the third instructions to determine whether responses from the second language model satisfy a sufficiency criterion comprise instructions to determine whether at least one of the responses indicates a confidence of at least a specified minimum confidence.

13. The non-transitory, machine-readable medium of claim 12, wherein the third instructions to determine whether responses from the second language model satisfy a sufficiency criterion further comprise the third instructions to determine whether at least one of the responses indicates a reason for the identified product as well as confidence of at least a specified minimum confidence.

14. The non-transitory, machine-readable medium of claim 9, wherein the program code further comprises fourth instructions to maintain an embeddings database for each of the plurality of categories with documentation of products in the corresponding category, wherein the second instructions comprise instructions to search the embeddings databases and incorporate results of the search into the prompt submitted to the second language model.

15. The non-transitory, machine-readable medium of claim 9, wherein the program code further comprises fourth instructions to separately input into the second language model for each category of products documentation of products in the category.

16. An apparatus comprising:
a processor; and
a machine-readable medium having instructions stored thereon that are executable by the processor to cause the apparatus to,
prompt a first language model to generate a structured description of an input description of a cybersecurity issue;

prompt a second language model to identify which of multiple products is most relevant to the cybersecurity issue, wherein the instructions to prompt the second language model comprise instructions to,
for each of a plurality of product categories,
construct a prompt with task instructions to identify a relevant product in the product category based on the structured description, to indicate confidence that the identified product is relevant, and to provide a reason the identified product is relevant; and
submit the prompt to the second language model; and
determine whether responses from the second language model satisfy a sufficiency criterion and to either indicate the identified product having highest confidence as the most relevant to the cybersecurity issue if the responses satisfy the sufficiency criterion or again prompt the second language model to identify a most relevant product for the cybersecurity issue based on the structured description if the responses do not satisfy the sufficiency criterion.

17. The apparatus of claim 16, wherein the instructions to prompt the first language model comprise instructions executable by the processor to cause the apparatus to create and submit to the first language model a prompt with a task instruction to generate the structured description according to a schema that includes fields or keys for attack vector, attack type, and description.

18. The apparatus of claim 16, wherein the instructions to determine whether responses from the second language model satisfy a sufficiency criterion comprise instructions executable by the processor to cause the apparatus to determine whether at least one of the responses indicates a confidence of at least a specified minimum confidence.

19. The apparatus of claim 18, wherein the instructions to determine whether responses from the second language model satisfy a sufficiency criterion further comprise the instructions executable by the processor to cause the apparatus to determine whether at least one of the responses indicates a reason for the identified product as well as confidence of at least a specified minimum confidence.

20. The apparatus of claim 16, wherein the machine-readable medium further has instructions stored thereon that are executable by the processor to cause the apparatus to,
maintain an embeddings database for each of the plurality of product categories with documentation of products in the corresponding product category and to search the embeddings databases and incorporate results of the search into the prompt submitted to the second language model; or
separately input into the second language model for each product category documentation of products in the category.

* * * * *